A. STEINMEYER.
SPEED GAGE.
APPLICATION FILED OCT. 12, 1908.
949,990.
Patented Feb. 22, 1910.
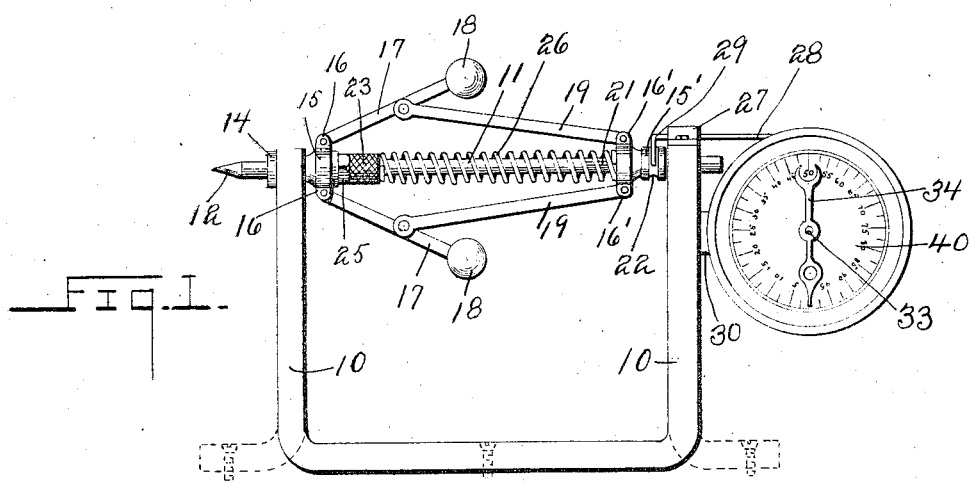
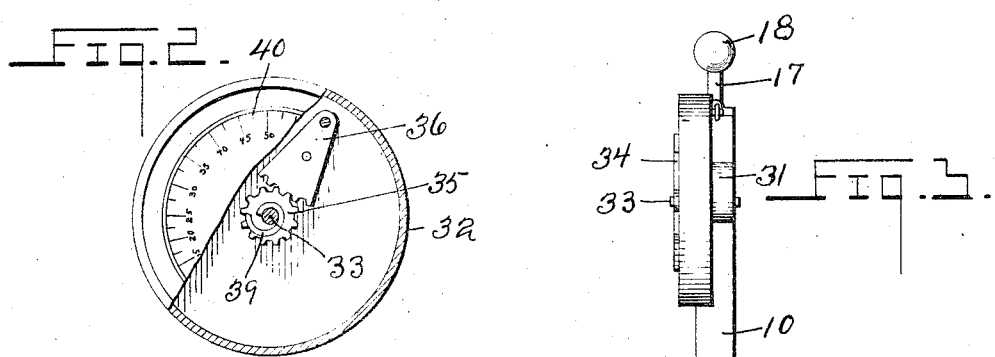
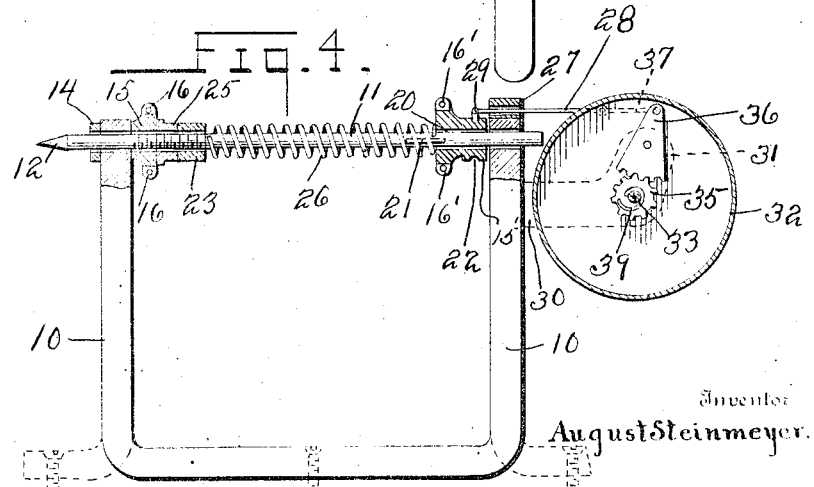
Witnesses
E. E. Johansen.
C. Carter Sheriff.
Inventor
August Steinmeyer.
By Woodward & Chandlee
Attorneys

UNITED STATES PATENT OFFICE.

AUGUST STEINMEYER, OF PALATINE, ILLINOIS.

SPEED-GAGE.

949,990.     Specification of Letters Patent.     Patented Feb. 22, 1910.

Application filed October 12, 1908. Serial No. 457,351.

*To all whom it may concern:*

Be it known that I, AUGUST STEINMEYER, a citizen of the United States, residing at Palatine, in the county of Cook and State of Illinois, have invented certain new and useful Improvements in Speed-Gages, of which the following is a specification.

This invention relates to speed indicators, and more particularly to that class utilizing centrifugal weights to rotate a pointer over a dial.

An object of the invention is to provide such an indicator which may be used either in horizontal or vertical position.

Another object is to provide a means for adjusting the tension of the governor spring.

A particular object is to provide such an indicator having parts so designed that they may be manufactured, and assembled at a minimum cost for material and labor.

In order to accomplish the preceding objects the efforts of the inventor are directed to constructing such an indicator having few parts, and yet which will be accurate in operation.

Other objects and advantages will be apparent from the following description and it will be understood that changes in the specific structure shown and described may be made within the scope of the claim without departing from the spirit of the invention.

In the drawings forming a portion of this specification, and in which like numerals of reference indicate similar parts in the several views, Figure 1 is a side view of the device, Fig. 2 is a detail of the indicator mechanism, Fig. 3 is an end view of the device, Fig. 4 is a longitudinal sectional view through the device.

Referring to the drawings, there is shown an indicator comprising a supporting portion including two bearing members 10 carrying a shaft 11 revolubly therethrough, the shaft having its outer end 12 pointed, for engagement with a revolving object, the speed of which it is desired to observe. Secured to the shaft 11 adjacent its outer end, outwardly of the bearing 10 there is a collar 14. Secured to the shaft 11 inwardly of the bearing 10 in spaced relation with the collar 14 there is a second collar 15 having a plurality of perforated ears 16 extending laterally therefrom, to which there are pivoted arms 17 having weights 18 at their outer ends. Secured pivotally intermediately of the arms 17 there are links 19 extending to and engaged with perforated ears 16' of a slidable collar 15' engaged slidably upon the shaft 11 adjacent the opposite support 10. The collar 15' is provided with a passage 20 therethrough adapted to engage slidably over a suitable rib member 21 carried by the shaft 11 to hold the collar 15' against rotation relatively. The collar 15' is provided with an outwardly extending peripherally recessed portion 22, for a purpose to be subsequently indicated. The shaft 11 is threaded adjacent its pointed end inwardly of the collar 15, and has engaged thereon a threaded sleeve 23, and outwardly of the sleeve 23 there is a lock nut 25 adapted to impinge thereagainst to hold it in place. Engaged around the shaft 11, and seated against the collar 23 there is a helical spring 26 extending inwardly and bearing against the collar 15'. The inner support 10 carries a guide member 27 having a rod 28 slidably engaged therein, the inner end of the rod being provided with a laterally extending yoke member 29 engaged slidably in the recessed portion 22. Extending outwardly of the support 10 there is an integral case carrying portion 30 offset laterally from the support 10, and provided with an extension 31 extending upwardly toward the axis of the shaft 11, and provided with a perforation adjacent its extremity. A perforation is formed through the member 30 at its outer end. A casing 32 is secured to the portion 30 in a suitable manner and has spaced openings through its base registering with those in the portions 30 and 31. Secured revolubly in the openings through the portion 30 there is a shaft 33, carrying a pointer 34, and having a gear 35 thereon, as shown. Pivoted centrally in the opening in the extension 31, there is a gear segment 36 meshing with the gear 35 and carrying at its outer end a link 37 connected pivotally to the rod 28. A hair-spring 39 is engaged with the shaft 33, and is adapted to hold the pointer 34 indicating zero on a dial 40 fixed within the casing 32. It will be understood, that if desired the support portion may be extended to form a handle, as illustrated, or to present flanged portions adapted for engagement with a portion of machinery, as shown in dotted lines, while the outer end portion of the shaft may be connected permanently to a rotating shaft or other revolving member, by means of a suitable sleeve.

In use, the point 12 of the shaft 11 may be presented against the center of a rotating shaft or wheel, and forced thereagainst by means of the support portion 10, the thrust being taken up by the collar 14. It is perceived that as the shaft revolves centrifugal force will throw the weight 18 outwardly, thus drawing the collar 15' inwardly against the tension of the spring 26 and thus oscillating the gear segment 36 for rotation of the indicator 34.

What is claimed is:—

An indicator comprising spaced support arms, a revoluble shaft carried thereby, said shaft having a pointed end portion projecting outwardly of one of said supports, collars secured to the shaft on opposite sides of one of the supports, the inner one of said collars carrying pivotally a plurality of weighted arms, a second collar engaged slidably upon the shaft, links pivotally connected between the arms and the slidable collar, said slidable collar having a peripherally recessed extension outwardly thereof, said shaft being threaded inwardly of the first named collars, a centrally threaded sleeve provided with a radial flange engaged thereon, a lock nut engaged outwardly of the sleeve, a spring seated upon the sleeve and bearing against the sliding collar, a channeled guide portion carried by the support member adjacent the sliding collar, a rod engaged slidably in the guide portion and provided with a laterally extending yoke portion disposed slidably in the recess of the sliding collar, a laterally offset support arm carried by the last named support member, a dial carried thereby, a revoluble shaft carried centrally of the dial, a pointer carried by the shaft, a gear carried by the shaft, a hair-spring engaged with the shaft to hold the pointer yieldably at one limit of its movement, a centrally pivoted gear segment carried by the arm, and meshing with the gear, and a link connected with the sliding rod and with the gear segment oppositely of the gear.

In testimony whereof I affix my signature, in presence of two witnesses.

AUGUST STEINMEYER.

Witnesses:
  A. R. HEIMSOTH,
  J. BAUMGARTEN.